United States Patent
Boyd et al.

(10) Patent No.: US 7,761,426 B2
(45) Date of Patent: Jul. 20, 2010

(54) APPARATUS, SYSTEM, AND METHOD FOR CONTINUOUSLY PROTECTING DATA

(75) Inventors: Kenneth W. Boyd, Tucson, AZ (US); John T. Flynn, Jr., Morgan Hill, CA (US); Robert F. Kern, Otter Rock, OR (US); Gregory E. McBride, Vail, AZ (US); William F. Micka, Tucson, AZ (US); David M. Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/295,933

(22) Filed: Dec. 7, 2005

(65) Prior Publication Data

US 2007/0130214 A1 Jun. 7, 2007

(51) Int. Cl.
  *G06F 17/30* (2006.01)
(52) U.S. Cl. ..................................... 707/655
(58) Field of Classification Search ........................ None
  See application file for complete search history.

(56) References Cited

U.S. PATENT DOCUMENTS

| | | | |
|---|---|---|---|
| 5,446,871 A | 8/1995 | Shomler et al. | 395/180 |
| 5,623,599 A | 4/1997 | Shomler | 395/182.16 |
| 5,720,029 A | 2/1998 | Kern et al. | 395/182.18 |
| 6,157,991 A | 12/2000 | Arnon | 711/161 |
| 6,260,124 B1 | 7/2001 | Crockett et al. | 711/162 |
| 6,460,055 B1 * | 10/2002 | Midgley et al. | 707/204 |
| 6,463,501 B1 | 10/2002 | Kern et al. | |
| 6,502,205 B1 | 12/2002 | Yanai et al. | 714/7 |
| 6,735,637 B2 | 5/2004 | Cochran | 710/5 |
| 6,904,503 B2 | 6/2005 | Urabe et al. | 711/162 |
| 6,912,629 B1 | 6/2005 | West et al. | 711/161 |
| 2003/0061537 A1 | 3/2003 | Cha et al. | 714/16 |
| 2003/0158920 A1 * | 8/2003 | Lynch et al. | 709/220 |
| 2003/0177321 A1 * | 9/2003 | Watanabe | 711/161 |
| 2004/0139124 A1 * | 7/2004 | Kawamura et al. | 707/202 |
| 2004/0193622 A1 * | 9/2004 | Peleg et al. | 707/100 |
| 2005/0071585 A1 | 3/2005 | Hayardeny et al. | 711/162 |
| 2005/0223046 A1 * | 10/2005 | Smith | 707/200 |
| 2006/0225073 A1 * | 10/2006 | Akagawa et al. | 718/1 |

FOREIGN PATENT DOCUMENTS

| | | |
|---|---|---|
| EP | 0441087 A1 | 8/1991 |
| EP | 1400899 A2 | 8/2003 |
| GB | 2359393 | 9/2000 |

OTHER PUBLICATIONS

Office Action from China dated Nov. 6, 2009.

* cited by examiner

*Primary Examiner*—John R. Cottingham
*Assistant Examiner*—Nicholas E Allen
(74) *Attorney, Agent, or Firm*—Kunzler Needham Massey & Thorpe

(57) ABSTRACT

An apparatus, system, and method are disclosed for continuously protecting data. A mirror module mirrors a primary record set to a base record set. A log module accumulates each record change to the primary record set in a log. A change selection module selects a record change from the log. A change application module applies the selected record change to the base record set to form a recovered record set.

30 Claims, 11 Drawing Sheets

APPARATUS, SYSTEM, AND METHOD FOR CONTINUOUSLY PROTECTING DATA

BACKGROUND OF THE INVENTION

1. Field of the Invention

This invention relates to protecting data and more particularly relates to continuously protecting digital data.

2. Description of the Related Art

A data processing system stores and processes large amounts of valuable data such as financial transaction records, shipping and inventory records, and service transaction records on data storage devices. The data may be lost if a data storage device fails, the data becomes corrupted, or if data is erroneously entered. Because the cost of losing data is high, the data processing system may employ redundant data storage devices to increase data availability and protect against loss. For example, the data processing system may include a redundant array of independent disk ("RAID") storage system that redundantly stores data on multiple disks. The data processing system may continue to store and retrieve data even if a disk data storage device in the RAID system fails.

The data processing system may also backup data to protect against data loss. For example, the data processing system may save the contents of one or more data storage devices to magnetic tape or the like on a regular basis such as nightly. If data is subsequently lost from a data storage device, an instance of the data from the time of the backup may be recovered. Unfortunately, there is typically a significant difference between the data processing system data at the time of the data loss and the backup data. Therefore data backups do not completely protect against data loss.

As a result, the data processing system may make frequent flash backups of data by copying the data to backup data storage devices. Flash backups further reduce the amount of data that is irretrievably lost as the time interval between flash backups is often small.

Unfortunately, frequent flash backups offer less protection against data loss due to data that is corrupted or erroneously entered, data that is referred to herein as corrupt data. Data may be corrupted by duplicate entries, erroneous entries, software viruses, and unauthorized entries. Corrupt data may persist in the data processing system for some time before discovered. As a result, flash backups are not sufficient to protect valid data while removing corrupt data.

From the foregoing discussion, it should be apparent that a need exists for an apparatus, system, and method that continuously protect data. Beneficially, such an apparatus, system, and method would make all data instances available for recovery to the data processing system.

SUMMARY OF THE INVENTION

The present invention has been developed in response to the present state of the art, and in particular, in response to the problems and needs in the art that have not yet been fully solved by currently available data protection methods. Accordingly, the present invention has been developed to provide an apparatus, system, and method for continuous data protection that overcome many or all of the above-discussed shortcomings in the art.

The apparatus to continuously protect data is provided with a plurality of modules configured to functionally execute the necessary steps of mirroring a primary record set, accumulating a log of record changes, selecting a record change, and applying the selected record change. These modules in the described embodiments include a mirror module, a log module, a change selection module, and a change application module.

The mirror module mirrors or makes a complete copy of a primary record set to a base record set. The primary record set comprises a plurality of records residing on a primary volume. The primary volume may be a logical volume comprising portions of one or more data storage devices such as hard disk drives. The mirror module mirrors the primary record set to a backup volume, the mirrored copy forming the base record set. The base record set is equivalent to the primary record set instance when the primary record set is mirrored.

The log module accumulates a log of record changes to the primary record set. In one embodiment, each record change comprises a consistency group. Each consistency group may comprise data tracking a write to a record, a write update to the log, and a write completion indicating the completion of the record change. The log may accumulate each record change made to the primary record set subsequent to mirroring the primary record set to the base record set.

The change selection module selects a record change from the log. In one embodiment, a user selects the record change. The user may select the record change as occurring forward in time from a specified recovery time. In addition, the user may select the record change as occurring backward in time from the specified recovery time. In one embodiment, the user may select and deselect the record change.

The change application module applies the selected record change to the base record set to form a recovered record set. For example, change application module may apply the selected record change by replicating a data write comprised by the selected record change to the primary record set as recorded by the record change, wherein the data write is replicated with the base record set. The base record set with the applied record change comprises the recovered record set. In one embodiment, the recovered record set is equivalent to the primary record set at the specified recovery time. The apparatus continuously protects data by maintaining the base record set and log from which a plurality of instances of the primary record set may be recovered.

A system of the present invention is also presented to continuously protect data. The system may be embodied in one or more data storage systems. In particular, the system, in one embodiment, includes a primary volume, a primary controller, a backup volume, and a backup controller. In addition, the backup controller may further include a mirror module, a log module, a change selection module, and a change application module.

In one embodiment, the primary volume stores data as a primary record set for one or more host systems. The host systems may be computer workstations, servers, or mainframe computers. In a certain embodiment, the primary volume is integrated with the host system. The primary controller manages the primary volume. For example, the primary controller may perform maintenance operations on the primary volume, write data to the primary volume, or read data from the primary volume.

The backup volume stores data that is used to recover the primary record set. In one embodiment, the backup volume includes a base record set and a log. The backup controller manages the backup volume. The mirror module mirrors the primary record set to the base record set. The log module accumulates each record change to the primary record set in the log. Using the base record set and the log module, the system can recover a plurality of instances of the primary record set.

The change selection module selects a record change from the log. The change application module applies the selected record change to the base record set to form a recovered record set. The recovered record set is a specified instance of the primary record set. The system continuously protects data by allowing a continuous set of primary record set instances to be recovered. In addition, the system allows the records of the primary record set to be selectively recovered, supporting the avoidance of corrupted data.

A method of the present invention is also presented for continuously protecting data. The method in the disclosed embodiments substantially includes the steps necessary to carry out the functions presented above with respect to the operation of the described apparatus and system. In one embodiment, the method includes mirroring a primary record set, accumulating a log of record changes, selecting a record change, and applying the selected record change.

A mirror module mirrors a primary record set to a base record set. A log module accumulates each record change to the primary record set in a log. A change selection module selects a record change from the log. A change application module applies the selected record change to the base record set to form a recovered record set. The method continuously protects data by supporting the recovery of a continuous, broad plurality of primary record set instances.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention mirrors a primary record set to a base record set and accumulates each record change to the primary record set in a log. In addition, the embodiment of the present invention selects a record change from the log and applies the selected record change to the base record set to form a recovered record set wherein the recovered record set is a desired instance of the primary record set including an instance without corrupted data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
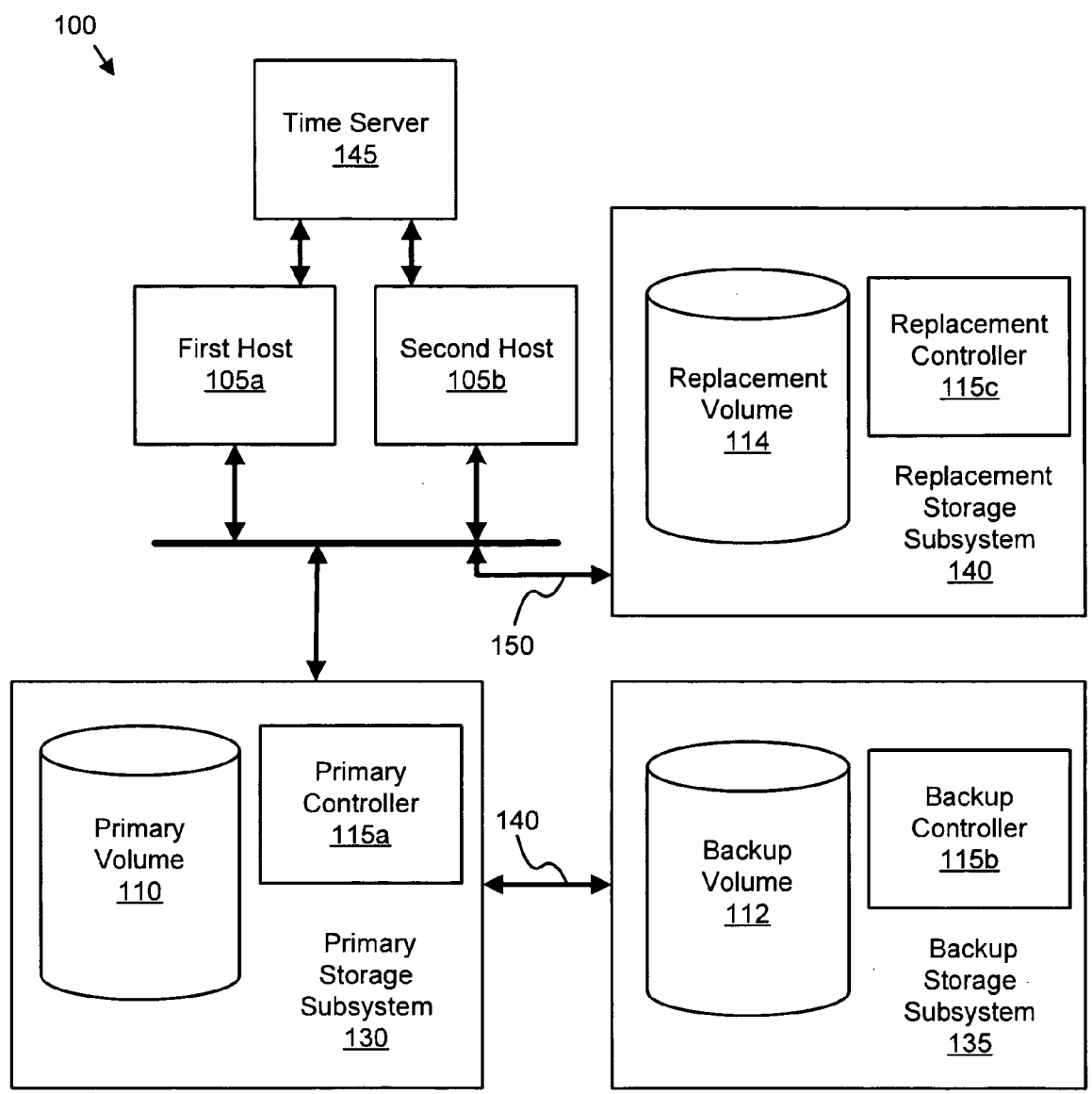
FIG. 1 is a schematic block diagram illustrating one embodiment of a basic data processing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data processing system 100 in accordance with the present invention. The system 100 includes one or more hosts 105, a primary storage subsystem 130, a backup storage subsystem 135, a replacement storage subsystem 140, and a time server 145. The primary storage subsystem 130 includes a primary volume 110 and a primary controller 115a. The backup storage subsystem 135 includes a backup volume 112 and a backup controller 115b. The replacement storage system 140 includes a replacement volume 114 and a replacement controller 115c. Although the system 100 is depicted with two hosts 105, one primary storage subsystem, 130, one backup storage subsystem 135, and one replacement storage subsystem 140, any number of hosts 105 and storage subsystems 130, 135, 140 may be employed. In addition, each storage subsystem 130, 135, 140 may comprise one or more controllers 115 and one or more volumes 110.

In one embodiment, the time server 145 provides a standard time to the hosts 105. In addition, the time server 145 may provide a standard time to each controller 115. For example, the time server 145 may provide the time used to time stamp data throughout the system 100.

Each volume 110, 112, 114 may be configured as a logical volume. In one embodiment, each volume 110, 112, 114 comprises one or more logical partitions of one or more storage devices such as hard disk drives, optical storage devices, magnetic tape drives, semiconductor storage devices, and micromechanical storage devices. For example, the primary volume 110 may comprise logical partitions of one or more hard disk drives while the backup volume 112 may comprise one or more logical partitions of one or more magnetic tapes. Each logical partition may comprise one or more physical partitions of a storage media such as a hard disk, a magnetic tape, or a micromechanical storage array.

The host 105 may store data on the primary volume 110. In one embodiment, the primary storage subsystem 130 communicates with the host 105 over a network. In an alternate embodiment, the host 105 may integrate the primary storage subsystem 130 and communicate with the primary storage subsystem 130 over an internal data bus.

The primary controller 115a manages the primary volume 110. In one embodiment, the primary controller 115a is a dedicated storage controller. In an alternate embodiment, the primary controller 115a is integrated with one or more storage devices comprised by the primary volume 110. The primary controller 115a may write data to and read data from the primary volume 110. In addition, the primary controller 115a may perform one or more maintenance operations on the primary volume 110. For example, the primary controller 115a may add logical partitions to the primary volume 110.

The backup storage subsystem 135 communicates with the primary storage subsystem 130 over a communications channel 140. The communications channel 140 may be a packet-switched network connection, a dedicated fiber optic communication line, or the like. The backup storage subsystem 135 may be co-located with the primary storage subsystem 130 or located at a remote site. For example, the backup storage subsystem 135 may be located at a great physical distance from primary storage subsystem 130 to mitigate the risks of system failure, natural disaster, and political unrest associated with the locality of the primary storage subsystem 130.

The contents of the primary volume 110 may be copied to the backup volume 112 to protect the data stored on the primary volume 110. Thus if the data of the primary volume 110 is lost or becomes corrupted, the backup volume 112 may be used to recover the instance of the primary volume 110 data that existed when the primary volume 110 is copied. In one embodiment, the data from the backup volume is recovered to the replacement volume 114 of the replacement storage subsystem 140. The hosts 105 may access the recovered data from the replacement volume 114 over a communications medium 150.

Unfortunately, if the host 105 modifies any data in the primary volume 110 subsequent to copying the primary volume 110 to the backup volume 112, the modified data is unprotected until the primary volume 110 data is again copied to the backup volume 112. The embodiment of the present invention continuously protects the data of the primary volume 110 by accumulating all changes to the primary volume 110, allowing each instance of the primary volume 110 to be recovered.

Figure 2A:
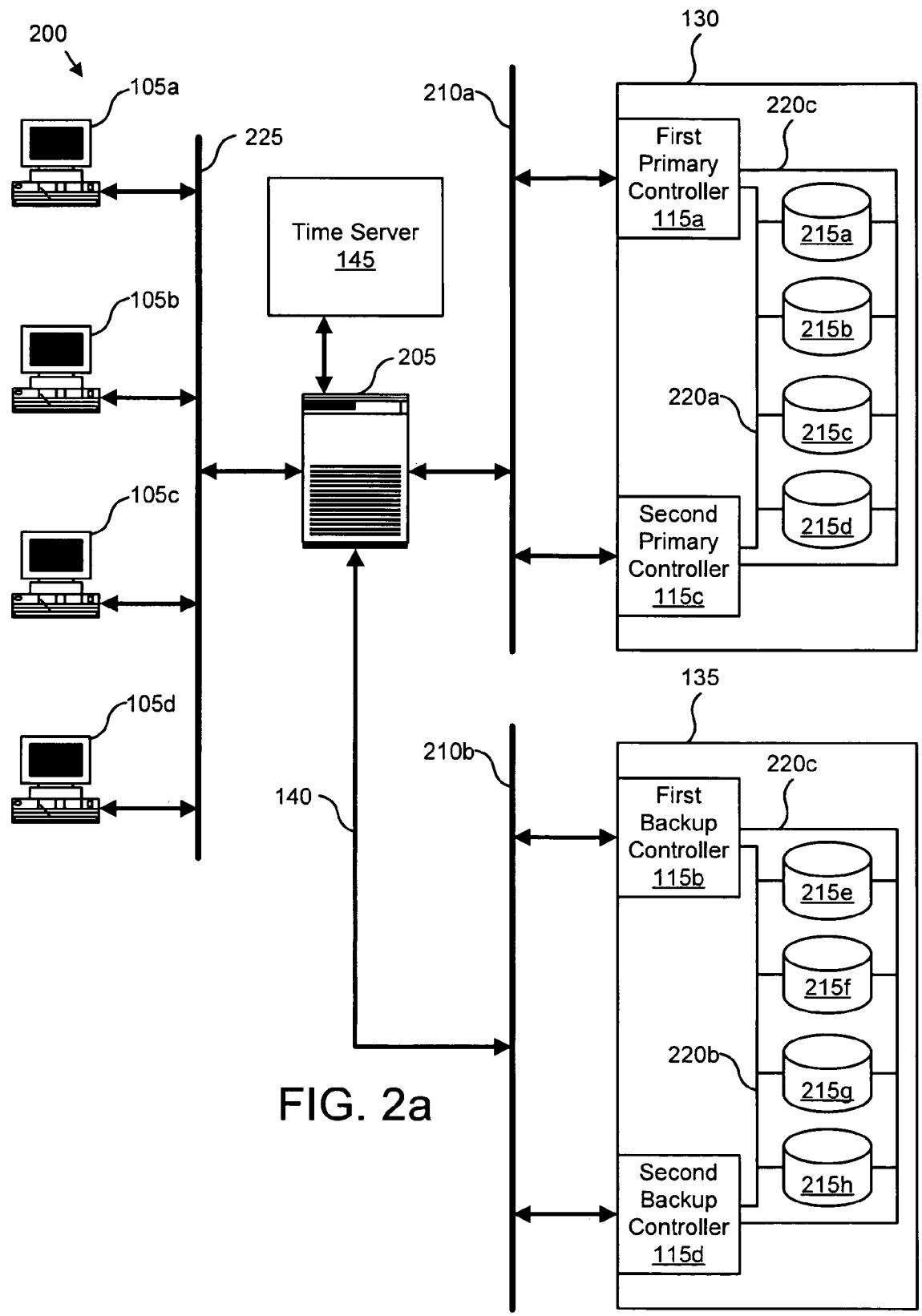
FIG. 2a is a schematic block diagram illustrating one embodiment of an extended data processing system in accordance with the present invention.

FIG. 2a is a schematic block diagram illustrating one embodiment of an extended data processing system 200 in accordance with the present invention. The system includes one or more elements of FIG. 1 wherein like elements are numbered alike. One or more hosts 105 communicate with a storage appliance 205 over a network 225 such as a local area network or the Internet. The storage appliance 205 communicates with a primary storage subsystem 130 over a first internal network 210a. In addition, the storage appliance 205 communicates with a backup storage subsystem 135 over a communications channel 140 and a second internal network 210b. The time server 145 may provide a standard time to the storage appliance 205. In addition, the time server 145 may provide a standard time for the primary storage subsystem 130 and the backup storage subsystem 135.

The primary storage subsystem 130 includes a first and second primary controller 115a, 115c. The backup storage subsystem 135 also is depicted as including a first and second backup controller 115b, 115d. Each controller 115 manages one or more storage devices 215. Each storage subsystem 130, 135 may employ any number of controllers 115 and storage devices 215. In one embodiment, the controller 115 communicates with the storage devices 215 over a data channel 220. The data channel 220 may be a Fibre Channel, a small computer system interface ("SCSI") channel, or the like.

The controller 115 may manage formatting of the storage devices 215, the allocation of logical partitions to volumes 110, and maintenance operations such as scrubbing as is well known to those skilled in the art. For example, the first primary controller 115a may organize the primary volume 110 of FIG. 1 from one or more logical partitions of one or more storage devices 215. Similarly, the second backup controller 115d may organize the backup volume 112 of FIG. 1 from one or more logical partitions of one or more storage devices 215.

Figure 2B:
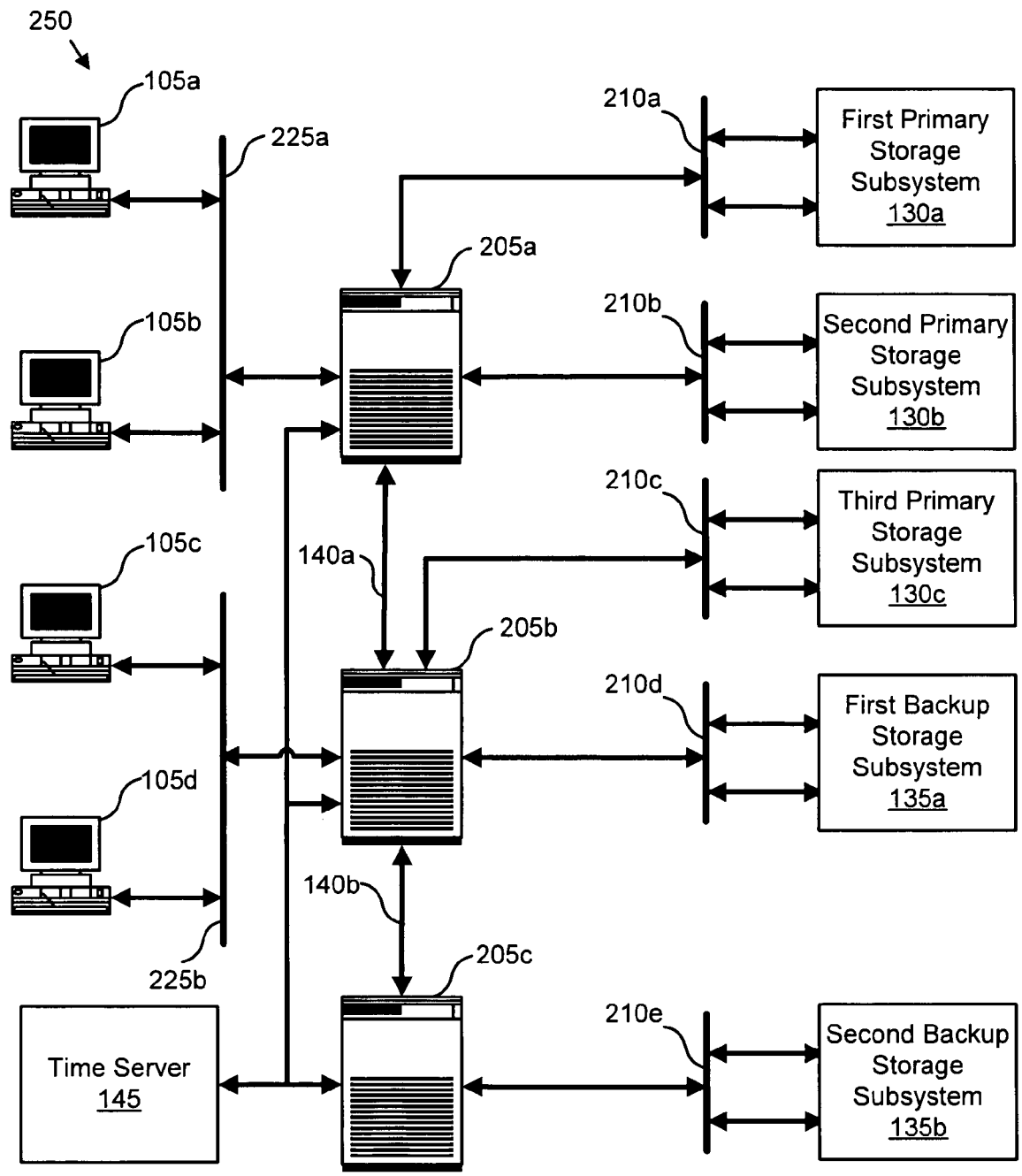
FIG. 2b is a schematic block diagram illustrating one embodiment of an alternate extended data processing system in accordance with the present invention.

FIG. 2b is a schematic block diagram illustrating one embodiment of an alternate extended data processing system 250 in accordance with the present invention. The system 250 includes elements of FIGS. 1 and 2a, like numbers referring to like elements. In addition, the system 250 adds a plurality of storage appliances 205, primary storage subsystems 130, and backup storage subsystems 135.

For simplicity, the elements internal to the primary storage subsystems 130 and backup storage subsystems 135 are not depicted, but are equivalent to the elements internal to the primary storage subsystems 130 and backup storage subsystems 135 of FIG. 2a. Although three primary storage subsystems 130, three storage appliances 205, and two backup storage subsystems 135 are shown, any number of primary storage subsystems 130, storage appliances 205, and backup storage subsystems 135 may be employed.

A record set may be copied or mirrored from a primary storage subsystem 130 across one or more storage appliances 205 to a backup storage subsystem 135. For example, a record set stored in a primary volume 110 of a first primary storage subsystem 130a may be mirrored across first, second, and third storage appliances 205a-c to a second backup storage subsystem 135b. Similarly, a record set stored in a primary volume 110 of a third primary storage subsystem 135c may be mirrored across the second storage appliance 205b to a first backup storage subsystem 135a.

Figure 3:
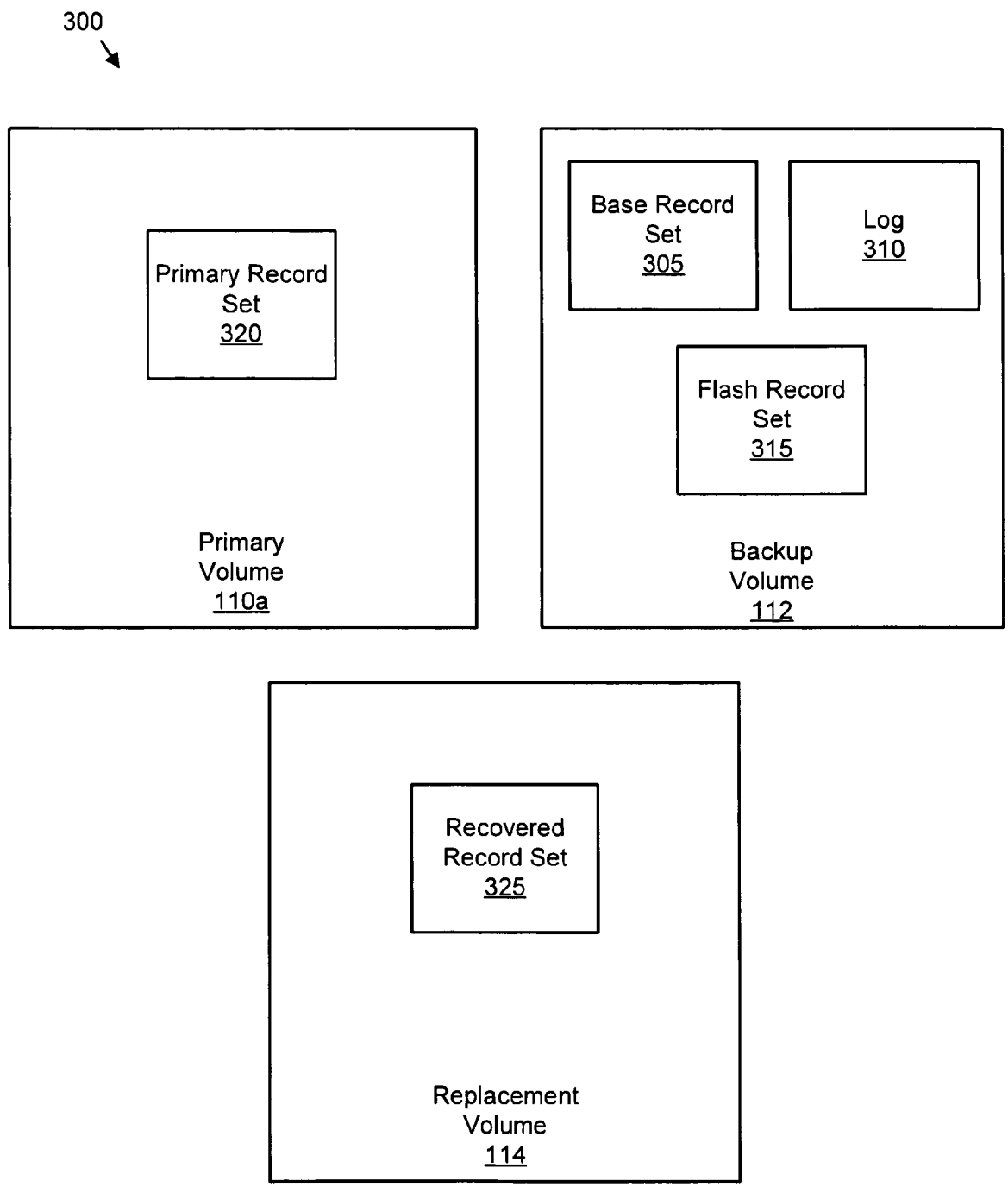
FIG. 3 is a schematic block diagram illustrating one embodiment of data volumes of the present invention.

FIG. 3 is a schematic block diagram illustrating one embodiment of data volumes 300 of the present invention. The description of the volumes 300 references elements of FIGS. 1 and 2, like numbers indicating like elements. The primary volume 110 is depicted as comprising a primary record set 320. The primary record set 320 may be the data stored by one or more hosts 105 on the primary volume 110. In one embodiment, the primary record set is comprised of one or more records. Each record may be a data word, a data block comprising one or more data words, or the like. For example, each record may be five hundred and twelve (512) data words with contiguous addresses.

The backup volume 112 is depicted as comprising a base record set 305, a log 310, and a flash record set 315. The base record set 305 may be a complete mirror of each record of the primary record set 320 at a specified instance in time. For example, each record of the primary record set 320 may be copied to a corresponding record of the base record set 305. In addition, the primary record set 320 and base record set 305 may share an address scheme, such that a portion of an address addressing a specified record of the primary record set 320 also addresses a copy of the specified record of the base record set 305.

The log 310 is configured to accumulate record changes. In one embodiment, the log 310 accumulates record changes occurring subsequent to the mirroring of the primary record set 320 to the base record set 305. Each record change describes a change to a record of the primary record set 320. For example, if data is written to the record, the record change describes the writing of the data such that the write operation may be replicated using the description. In one embodiment, the record change comprises the address of the record, and the data written to the record.

The flash record set 315 represents an instance of the primary record set 320. In one embodiment, the flash record set 315 is a temporal instance of the primary record set 320 such as a copy of the primary record set 320 at a specified time. In an alternate embodiment, the flash record set 315 is a logical instance of the primary record set 320 such as all uncorrupted records of the primary record set 320. The primary record set 320 may be copied directly to the flash record set 315. The embodiment of the present invention also supports the creation of the flash record set 315 from the base record set 305 and the log 310, allowing the flash record set 315 to be configured as any temporal or logical instance of the primary record set 320.

If the primary record set 320 is lost or corrupted, the embodiment of the present invention may also recover an instance of the primary record set 320 from the base record set 305 and log 310 as a recovered record set 325. In the depicted embodiment, the recovered record set 325 is stored on a replacement volume 114. For example, if the primary volume 110 failed and the primary volume 110 comprised the first and second storage devices 215a, 215b, the first primary controller 115a may create the replacement volume 114 from logical partitions of the third and fourth storage devices 215c, 215d. A controller 115 such as the first backup controller 115b may recover an instance of the primary record set 320 from the base record set 305 and the log 310 to the recovered record set 325.

Figure 4:
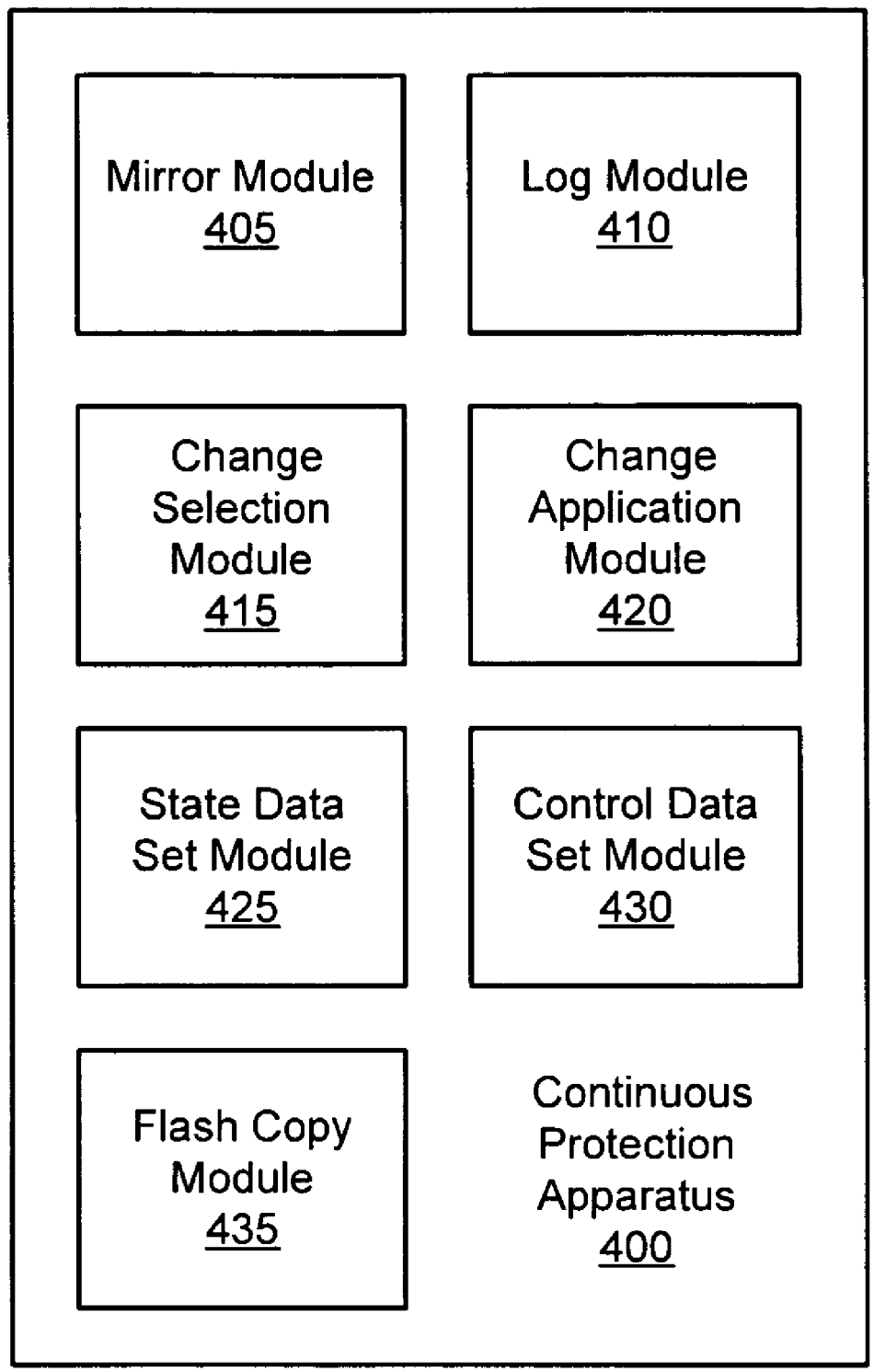
FIG. 4 is a schematic block diagram illustrating one embodiment of a continuous protection apparatus of the present invention.

FIG. 4 is a schematic block diagram illustrating one embodiment of a continuous protection apparatus 400 of the present invention. The description of the apparatus 400 references elements of FIGS. 1-3, like numbers indicating like elements. The apparatus 400 includes a mirror module 405, log module 410, change selection module 415, change application module 420, state data set module 425, control data set module 430, and flash copy module 435.

In one embodiment, one or more software processes executing on one or more controllers 115 comprise the mirror module 405, log module 410, change selection module 415, change application module 420, state data set module 425, control data set module 430, and flash copy module 435. In an alternate embodiment, a host 105 or a storage appliance 205 may execute the software processes comprising the mirror module 405, log module 410, change selection module 415, change application module 420, state data set module 425, control data set module 430, and flash copy module 435.

The mirror module 405 mirrors a primary record set 320 to a base record set 305. The base record set 305 is equivalent to the instance of the primary record set 320 existing when the primary record set 320 is mirrored. The mirror module 405 may mirror the primary record set 320 by copying each record of the primary record set 320 to the base record set 305. Alternatively, the mirror module 405 may mirror the primary record set 320 to a second instance of the base record set 305 by applying change records from a log 310 to a first instance of the base record set 305.

The log module 410 accumulates the log 310 of record changes to the primary record set 320. In one embodiment, each record change comprises a consistency group. Each consistency group may comprise data tracking a write to a record, a write update to the log 310, and a write completion indicating the completion of the record change. In one embodiment, the log module 410 accumulates time-ordered consistency groups comprising each record change to the primary record set 320 as the log 310.

The change selection module 415 selects a record change from the log 310. In one embodiment, a user directs the selection of the record change. The user may select the record change as occurring forward in time from a specified recovery time. In addition, the user may select the record change as occurring backward in time from the specified recovery time. In one embodiment, the user may select and deselect the record change.

The change application module 420 applies the selected record change to the base record set 305 to form a recovered record set 325. For example, the change application module 420 may apply the selected record change by replicating a data write to the primary record set 320 as the data write is recorded by the record change, the data write replicated with or applied to the base record set 305. In one embodiment, the change application module 420 applies the selected record change to a copy of the base record set 305. For example, the change application module 420 may copy the base record set 305 to a recovery volume 114, and apply the selected record change to the copy of the base record set 305 to form the recovered record set 325.

An instance of the base record set 305 and the applied record change comprises the recovered record set 325. The recovered record set 325 is equivalent to a specified logical and/or temporal instance of the primary record set 320. Thus any logical or temporal instance of the primary record set 320 may be recovered to the recovered record set 325.

In one embodiment, the state data set module 425 maps the volume 110 of the primary record set 320 or primary volume 110 to the volume 110 of the base record set 305 and log 310 or backup volume 112. For example, the state data set module 425 may select a backup volume 112 with sufficient capacity to support the primary record set 320. In one embodiment, the control data set module 430 tracks the status of each record change. In a certain embodiment, the control data set module 430 tracks status of a consistency group embodied by each record change.

In one embodiment, the flash copy module 435 creates a flash record set 315 from the base record 305 and the log 310. For example, the flash copy module 435 may create the flash record set 315 as an instance of the primary record set 320 at a specified time. The flash copy module 435 may copy the flash record set 315 to an archival storage media such as magnetic tape to preserve a point-in-time copy of the primary record set 320. The apparatus 400 continuously protects data by maintaining the base record set 305 and log 310 and supporting the recovery of a plurality of primary record set 320 instances.

Figure 5:
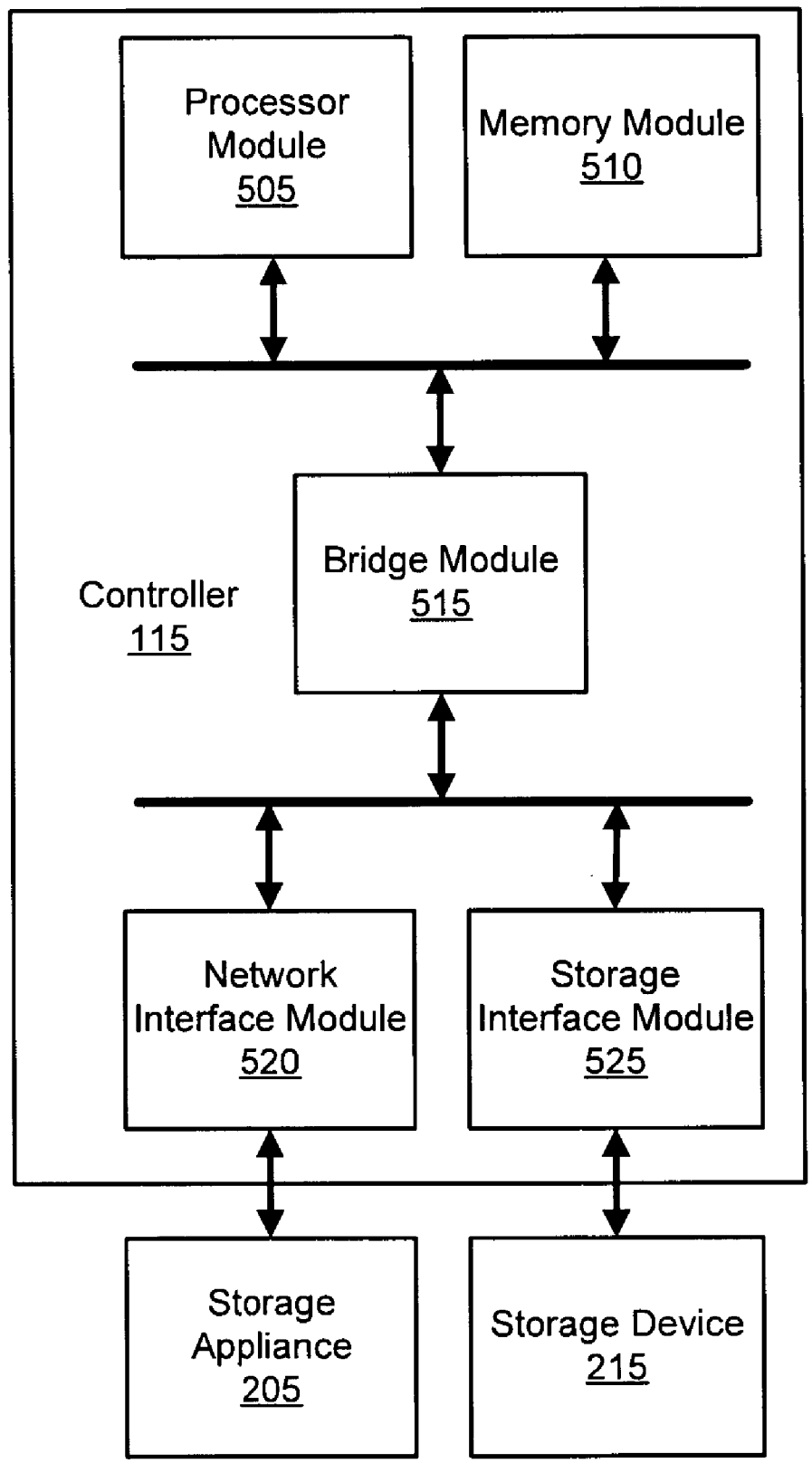
FIG. 5 is a schematic block diagram illustrating one embodiment of a controller of the present invention.

FIG. 5 is a schematic block diagram illustrating one embodiment of a controller 115 of the present invention. The description of the controller 115 references elements of FIGS. 1-4, like numbers indicating like elements. The controller 115 includes a processor module 505, memory module 510, bridge module 515, network interface module 520, and storage interface module 525. In addition, a storage appliance 205, and a storage device 215 are depicted in communication with the controller 115.

The processor module 505, memory module 510, bridge module 515, network interface module 520, and storage interface module 525 may be fabricated of semiconductor gates on one or more semiconductor substrates. Each semiconductor substrate may be packaged in one or more semiconductor devices mounted on circuit cards. Connections between the processor module 505, the memory module 510, the bridge module 515, the host interface module 520, and the storage interface module 525 may be through semiconductor metal layers, substrate to substrate wiring, or circuit card traces or wires connecting the semiconductor devices.

The memory module 510 stores software instructions and data. The processor module 505 executes the software instructions and manipulates the data as is well known to those skilled in the art. The processor module 505 communicates with the network interface module 520 and the storage interface module 525 through the bridge module 515.

In one embodiment, the memory module 510 stores and the processor module 505 executes one or more software processes comprising the mirror module 405, log module 410, change selection module 415, change application module 420, state data set module 425, control data set module 430, and flash copy module 435 of FIG. 4. For example, the processor module 505 executing one or more software processes comprising the mirror module 405 may mirror a primary record set 320 through the storage appliance 205, network interface module 520, and the storage interface module 525 to a backup volume 112 of the storage device 215 as a base record set 305. Similarly the processor module 505 executing one or more software processes comprising the log module 410 may copy one or more record changes through the storage appliance 205 to the storage device 215, accumulating the record changes as a log 310 residing on the storage device 215.

In addition the processor module 505 executing one or more software processes comprising the change selection module 415 and change application module 420 may select a record change from the log 310 through the storage interface module 525 and apply the selected record change to the base record set 305 residing on the storage device 215 through the storage interface module 525. The controller 115 supports continuous protection of data by maintaining the base record set 305 and log 310 and by applying a record change from the log 310 to the base record set to form a recovered record set 325.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
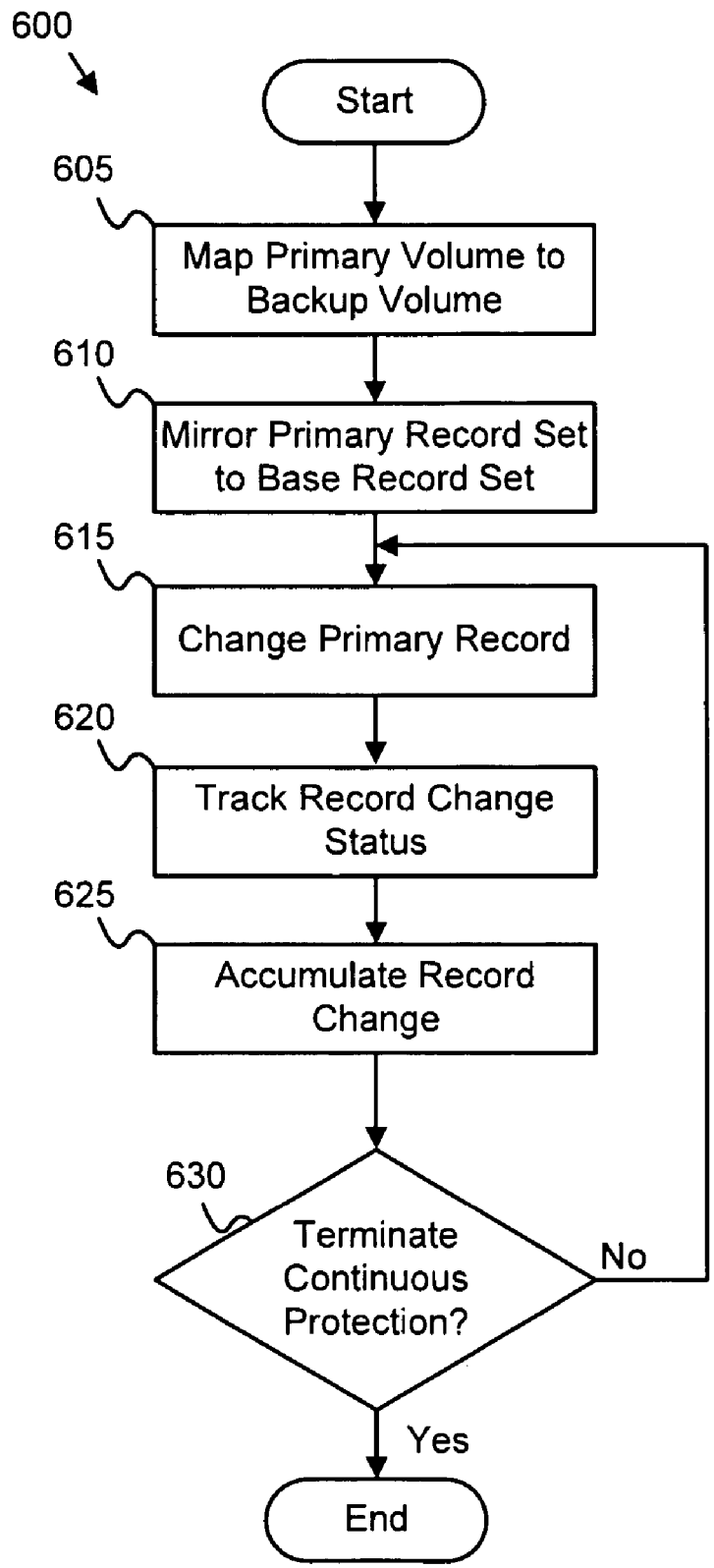
FIG. 6 is a schematic flow chart diagram illustrating one embodiment of a continuous protection method of the present invention.

FIG. 6 is a schematic flow chart diagram illustrating one embodiment of a continuous protection method 600 of the present invention. The method 600 substantially includes the steps necessary to carry out the functions presented above with respect to the operation of the described systems 100, 200, volumes 300, and apparatus 400 of FIGS. 1-4. The description of the method 600 references elements of FIGS. 1-5, with like numbers indicating like elements.

The method 600 begins and in one embodiment, a state data set module 425 maps 605 a primary volume 110 to a backup volume 112. In an alternate embodiment, the state data set module 425 maps 605 a plurality of primary volumes 110 to the backup volume 112. In a certain embodiment, the state data set module 425 is provided with data describing both a primary storage subsystem 130 and a backup storage subsystem 135. The state data set module 425 may use the data to map 605 the primary volume 110 to the backup volume 112. For example, the state data set module 425 may know that the capacity of the primary volume 110 is one hundred gigabytes (100 GB). The state data set module 425 may in such a circumstance map 605 the primary volume 110 to a backup volume 112 with two hundred percent (200%) of the primary volume's 110a capacity or two hundred gigabytes (200 GB).

A mirror module 405 mirrors 610 a primary record set 320 of the primary volume 110 to a base record set 305 of the backup volume 112. The primary record set 320 may be stored in one or more primary volumes 110. In addition, the primary volumes 110 may be located within one or more primary storage subsystems 120. In one embodiment, the mirror module 405 mirrors 610 the primary record set 320 by copying each record of the primary record set 320 to the base record set 305. The mirror module 405 may mirror 610 the primary record set 320 as part of a regularly scheduled backup operation. Alternatively, the mirror module 405 may mirror 610 the primary record set 320 when directed by a user. In a certain embodiment, the mirror module 405 mirrors 610 a plurality of primary record set 320 instances as a plurality of base record sets 305.

In one embodiment, a host 105 changes 615 a record of the primary record set 320. The host 105 may write data to the record to change the record. In a certain embodiment, a control data set module 430 tracks 620 the status of each record change. In a certain embodiment, the control data set module 430 tracks 620 status of a consistency group embodied by each record change. For example, the control data set module 430 may track 620 a write to a record, the accumulation of the record change to a log 310, and the completion of the record change. In addition, the control data set module 430 may track 620 all record changes until each record change is complete and accumulated in the log 310. In one embodiment, all data tracked 620 by the control data set module 430 is time-stamped from the time server 145.

A log module 410 accumulates 625 each record change to the primary record set 320 in the log 310. In one embodiment, the log module 410 accumulates 625 the record changes as time-ordered consistency groups. For a example, a first consistency group recording a first write to the primary record set 320 is accumulated 625 first in the log 310, with a second consistency group recording a second write the primary record set 320 accumulated 625 as logically subsequent to the first consistency group.

In one embodiment, the log module 410 accumulates 625 the record changes from a plurality of primary volumes 110. In addition, the log module 410 may accumulate 625 the record of changes across a plurality of storage appliances 205. For example, the log module 410 may accumulate 625 record changes to a primary record set 320 embodied in a primary volume 110 stored in the first primary storage subsystem 130a of FIG. 2b and a primary volume 110 stored in the second and third primary storage subsystems 130b-c of FIG. 2b, wherein the log module 410 accumulates 625 the record changes from the primary volumes 110 across the first, second, and third storage appliances 205a-c of FIG. 2b.

In one embodiment, the log module 410 determines 630 if continuous protection is terminated. The log module 410 may determine 630 if the continuous protection is terminated in response to direction from the user. Alternatively, the log module 410 may determine 630 if the continuous protection is terminated from a parameter of the primary record set 320.

If the continuous protection is not terminated, the method 600 loops and the host 105 changes 615 a record. If the log module 410 determines 630 the continuous protection is terminated, the method 600 terminates. The method 600 continuously protects the data of the primary record set 320 by maintaining the base record set 305 and the log 310.

Figure 7:
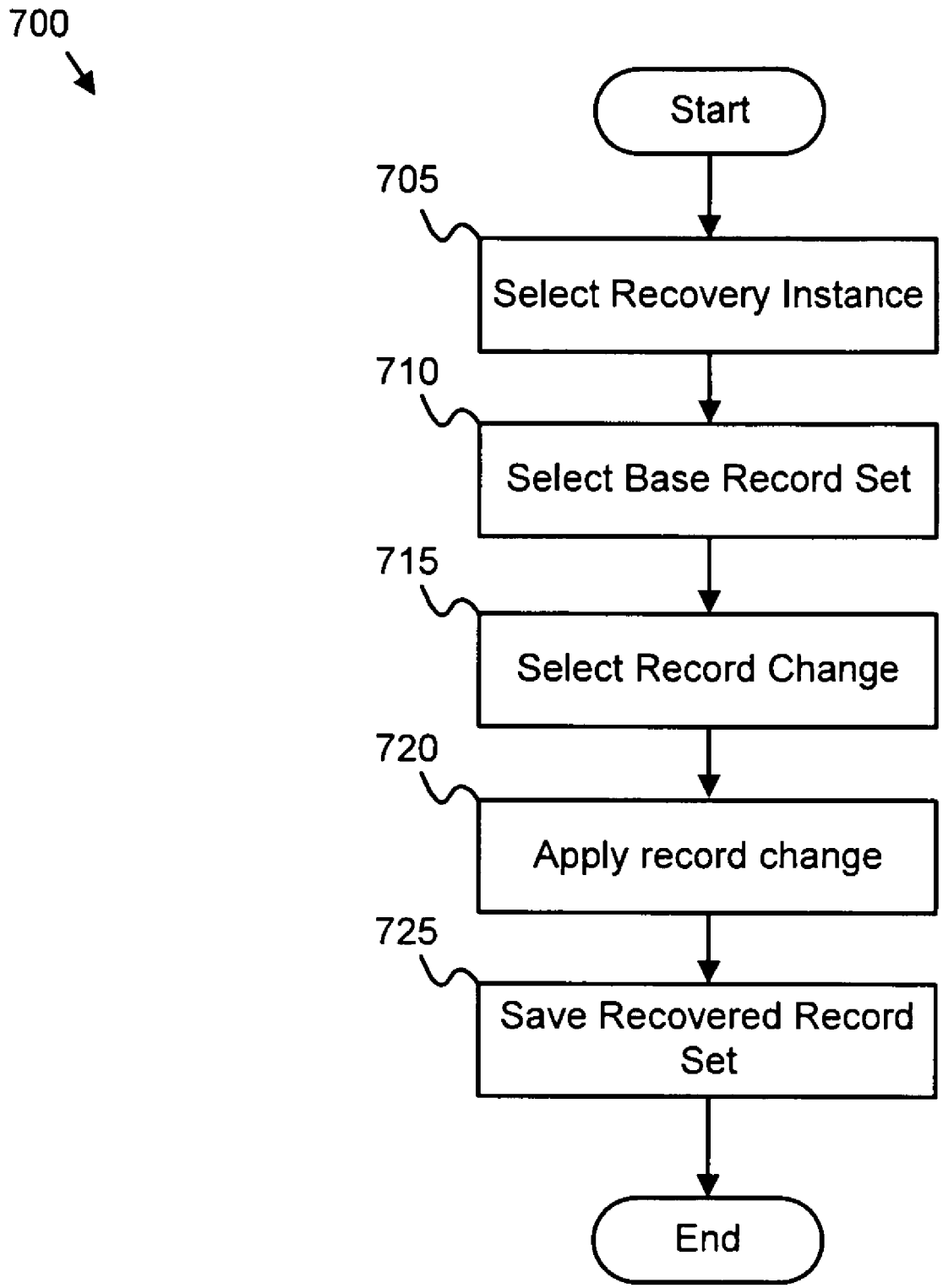
FIG. 7 is a schematic flow chart diagram illustrating one embodiment of a recovery method of the present invention.

FIG. 7 is a schematic flow chart diagram illustrating one embodiment of a recovery method 700 of the present invention. The method 700 substantially includes the steps necessary to carry out the functions presented above with respect to the operation of the described systems 100, 200, volumes 300, and apparatus 400 of FIGS. 1-4. The description of the method 700 references elements of FIGS. 1-5, with like numbers indicating like elements.

The method 700 begins and in one embodiment, a change selection module 415 selects 705 a recovery instance. The recovery instance represents a logical and temporal instance of a primary record set 320. For example, the recovery instance may specify the instance of the primary record set 320 at a specified time or temporal instance.

In addition, the recovery instance may specify that one or more record changes are omitted from or included with the temporal instance of the primary record set 320. For example, the recovery instance may specify the temporal instance of the primary record set 320 from midnight on Jul. 31, 2008 with each record change submitted from a specified first host 105a omitted from the temporal instance. In one embodiment, a user directs the selection 705 of the recovery instance by the change selection module 415. In an alternate embodiment, a software process such as an operating system or a software application directs the selection 705 of the recovery instance by the change selection module 415.

In one embodiment, the change selection module 415 selects 710 a base record set 305. The change selection module 415 may select 710 the base record set 305 as the only base record set 305. Alternatively, the change selection module 415 may select 710 an instance of the base record set 305 from a plurality of base record sets 305. The change selection module 415 may select 710 the base record set 305 in response to the recovery instance. For example, the change selection module 415 may select 710 the base record set 305 created most immediately prior to a time specified by the recovery instance.

The change selection module 415 selects 715 a record change from a log 310. In one embodiment, the change selection module 415 selects 715 the record change in response to the recovery instance. For example, if the recovery instance specified the instance of the primary record set 320 of 1:04 p.m. Eastern Daylight Time ("EDT"), the change selection module 415 may select 715 each record change accumulated from the creation of the selected base record set 305 until 1:04 p.m. EDT.

In one embodiment, a consistency group embodies the record change. The consistency group may comprise a data time stamp for the record change. The time server 145 may provide the time stamp data so that all elements use a consistent time. The change selection module 415 may select 715 the record change by comparing the data time stamp with the recovery instance. Thus if in the example above the selected base record set 305 is created at 12:00 p.m. EDT and a first record change comprises a data time stamp of 12:15 p.m. EDT, the change selection module 415 selects 715 the first record change.

A change application module 420 applies 720 the selected record change to the selected base record set 305 to form a recovered record set 325 and the method 700 terminates. In one embodiment, the change application module 420 replicates the original record change to the primary record set 320 by applying the record change to the base record set 305. In addition, the change application module 420 may apply 720 a plurality of record changes to the selected base record set 305 to form the recovered record set 325. In a certain embodiment, the change application module 420 applies 720 the selected record change to a copy of the base record set 305.

In one embodiment, the change application module 420 saves 725 the recovered record set 325. The change application module 420 may save 725 the recovered record set to a replacement volume 114. Alternatively, the change application module 420 may save 725 the recovered record set 325 to a backup volume 112 or a primary volume 110.

By applying one or more selected record changes to the base record set 305, the method 700 may form any instance of the primary record set 320 as the recovery record set 325. For example, the method 700 may form each temporal instance of the primary record set 320. The method 700 may also form a plurality of logical instances of each temporal instance of the primary record set 320 by selectively omitting or including one or more record changes. In addition, the method 700 may replicate a traditional point-in-time or event scheduled backup wherein the point-in-time backup is an instance of the primary record set 320. The change application module 420 may further create a plurality of recovery record sets 325 targeted at specific applications such as regulatory archival copies, off-site for archive copies, and copies shared with business partners and other third party entities.

Figure 8:
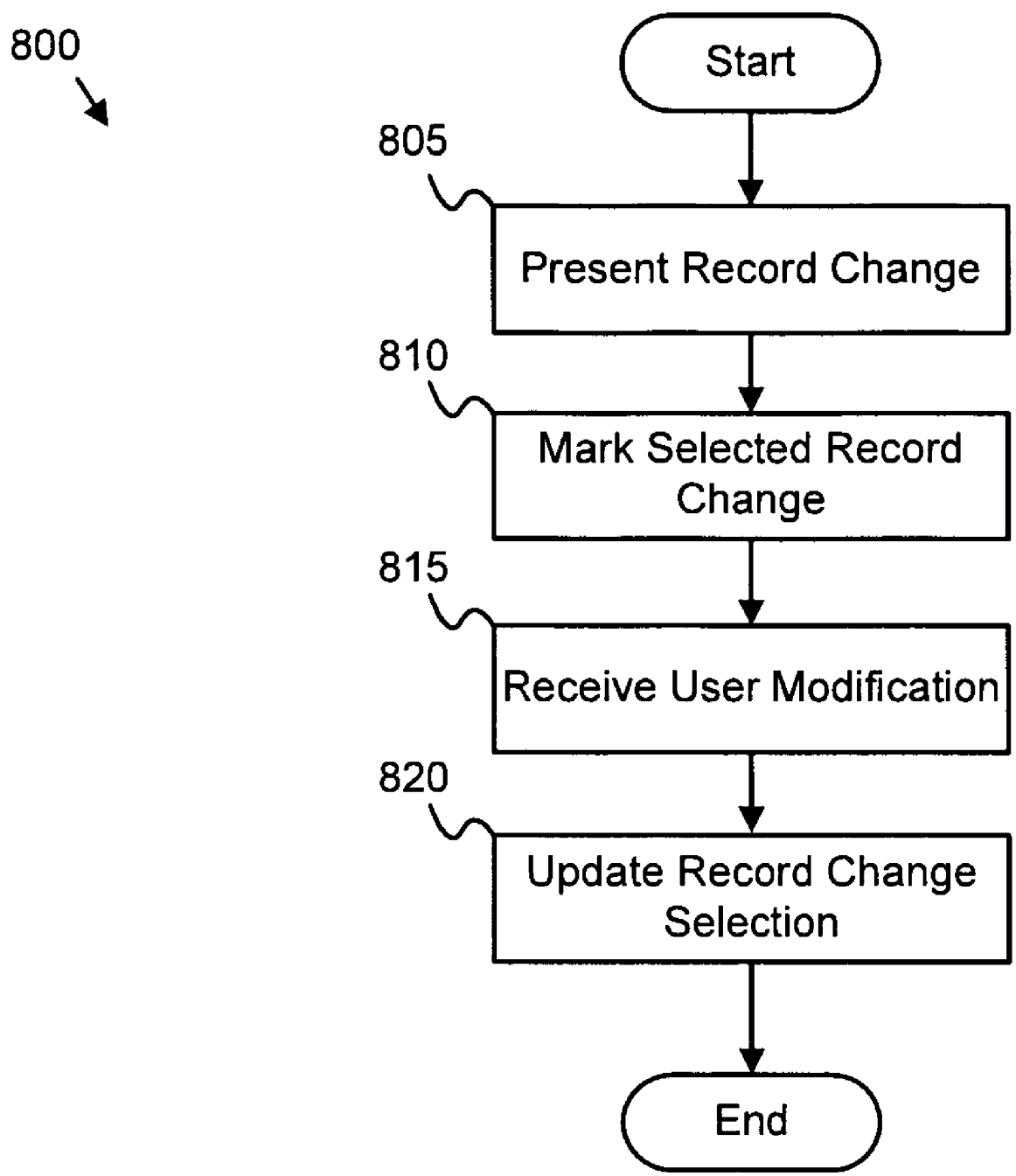
FIG. 8 is a schematic flow chart diagram illustrating one embodiment of a selection modification method of the present invention.

FIG. 8 is a schematic flow chart diagram illustrating one embodiment of a selection modification method 800 of the present invention. The method 800 substantially includes the steps necessary to carry out the functions presented above with respect to the operation of the described systems 100, 200, volumes 300, and apparatus 400 of FIGS. 1-4. The description of the method 800 references elements of FIGS. 1-5, with like numbers indicating like elements.

The method 800 begins and in one embodiment, a change selection module 415 presents 805 a record change to a user. The change selection module 415 may further present 805 a plurality of record changes. In a certain embodiment, the change selection module 415 presents 805 the record change to the user through a host 105. For example, the host 105 may be a computer workstation in communication with the change selection module 415.

The change selection module 415 may present 805 one or more record changes aggregated into one or more groups. For example, the change selection module 415 may aggregate record changes by time, by the source of the change, by data columns in a database, by type of change, and the like. In addition, the change selection module 415 may present 805 the changes aggregated hierarchically. For example, record changes may first be sorted by the source of the change and then by the time of the change.

In one embodiment, the change selection module 415 marks 810 each selected record change. The selected record changes may be selected as described in step 715 of FIG. 7. In an alternate embodiment, the change selection module 415 marks 810 each unselected record change. The host 105 may display the marked and unmarked record changes.

In a certain embodiment, the change selection module 415 receives 815 a user modification from the host 105. The user modification may indicate a selected or unselected status for the record change. For example, the user modification may indicate that the record change is selected or unselected. Alternatively, the user modification may specify a changed status for the record change. Thus if the record change is selected and the change selection module 415 receives 815 a user modification specifying a changed status, the user modification then indicates that the record change is unselected.

In one embodiment, the change selection module 415 updates 820 the record change selection in response to the user modification, and the method 800 terminates. The method 800 allows a user to select a distinct temporal and logical instance of a primary record set 320 for recovery to a recovered record set 325, including each temporal instance of the primary record set 320 and a plurality of derivations from each temporal instance of the primary record set 320.

Figure 9:
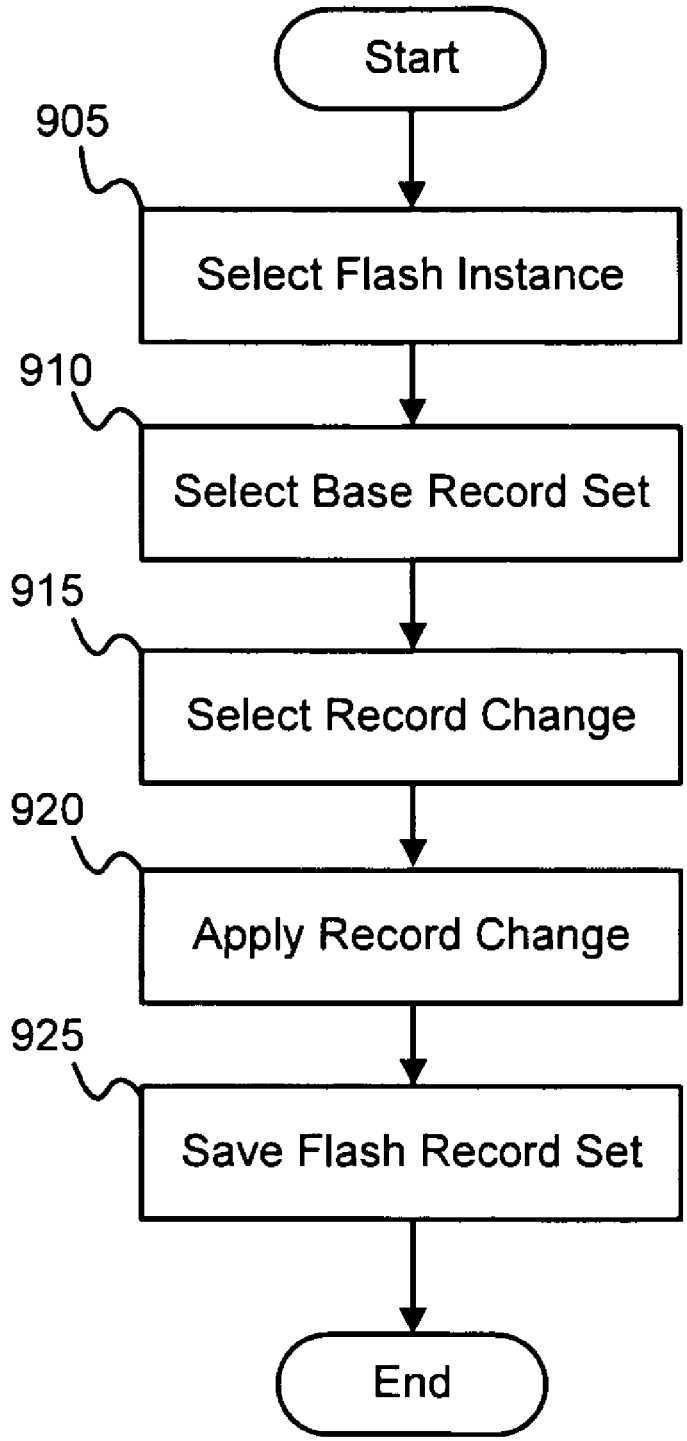
FIG. 9 is a schematic flow chart diagram illustrating one embodiment of a flash backup method of the present invention.

FIG. 9 is a schematic flow chart diagram illustrating one embodiment of a flash backup method 900 of the present invention. The method 900 substantially includes the steps necessary to carry out the functions presented above with respect to the operation of the described systems 100, 200, volumes 300, and apparatus 400 of FIGS. 1-4. The description of the method 900 references elements of FIGS. 1-5, with like numbers indicating like elements.

The method 900 begins and in one embodiment, a flash copy module 435 directs a change selection module 415 to select 905 a flash instance. The flash instance represents a logical and temporal instance of the primary record set 320. For example, the flash instance may specify a temporal instance of the primary record set 320.

In one embodiment, the flash copy module 435 directs the change selection module 415 to select 910 a base record set 305. The change selection module 415 may select 910 the base record set 305 as the only base record set 305. Alternatively, the change selection module 415 may select 910 an instance of the base record set 305 from a plurality of base record sets 305. The change selection module 415 may select 910 the base record set 305 in response to the flash instance. For example, the change selection module 415 may select 910 the base record set 305 created most immediately prior to the time specified by the flash instance.

In one embodiment, the flash copy module 435 directs the change selection module 415 to select 915 a record change from a log 310. The change selection module 415 may select 915 the record change in response to the flash instance. For example, if the flash instance specified the primary record set 320 instance of 12:01 a.m. EDT, the change selection module 415 may select 915 each record change accumulated from the creation of the selected base record set 305 until 12:01 a.m. EDT.

In one embodiment, the flash copy module 435 directs a change application module 420 to apply 920 the selected record change to the selected base record set 305 to form a flash record set 315 and the method 900 terminates. In one embodiment, the change application module 420 replicates the original record change to the primary record set 320 with the base record set 305. In addition, the change application module 420 may apply 920 a plurality of record changes to the selected base record set 305 to form the flash record set 315. In a certain embodiment, the change application module 420 applies 920 the selected record change to a copy of the base record set 305.

In one embodiment, a flash copy module 435 saves 925 the flash copy set 315 and the method 900 terminates. For example, the flash copy module 435 may copy the flash record set 315 to an archival storage media such as magnetic tape to preserve a point-in-time copy of the primary record set 320. The method 900 saves an instance of the primary record set 320 as a flash record set 315.

Figure 10:
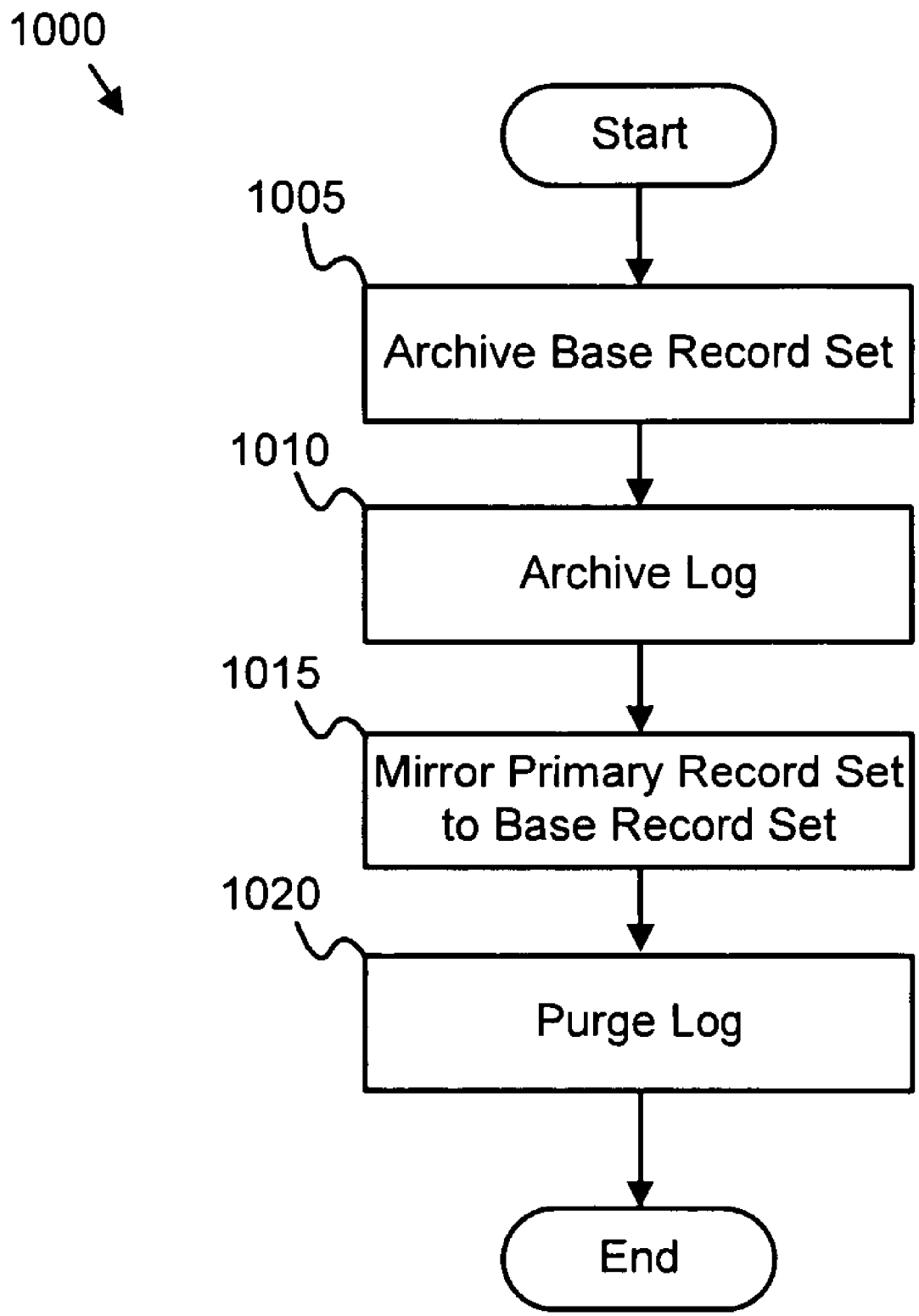
FIG. 10 is a schematic flow chart diagram illustrating one embodiment of a base record set/log initialization method of the present invention.

FIG. 10 is a schematic flow chart diagram illustrating one embodiment of a base record set/log initialization method 1000 of the present invention. The method 1000 substantially includes the steps necessary to carry out the functions presented above with respect to the operation of the described systems 100, 200, volumes 300, and apparatus 400 of FIGS. 1-4. The description of the method 1000 references elements of FIGS. 1-5, with like numbers indicating like elements.

The method 1000 begins and in one embodiment a flash copy module 435 archives 1005 a first instance of a base record set 320. The flash copy module 435 may archive 1005 the first instance base record set 320 by copying the first instance base record set 320 to an archival storage media such as magnetic tape. In addition, the flash copy module 435 may archive 1010 a log 310. For example, the flash copy module 435 may also copy the log 310 to magnetic tape.

In one embodiment, a mirror module 405 mirrors 1015 a primary record set 320 to a second instance of the base record set 305 as described in step 610 of FIG. 6. In addition, a log module 410 purges 1020 the log 310 such that the log 310 contains no record changes and the method 1000 terminates. The method 1000 initializes the base record set 320 and log 310.

The embodiment of the present invention mirrors 610 a primary record set 320 to a base record set 305 and accumulates 625 each record change to the primary record set 320 in a log 310. In addition, the embodiment of the present invention selects 715 a record change from the log 310 and applies 720 the selected record change to the base record set 320 to form a recovered record set 325 wherein the recovered record set 325 is a desired instance of the primary record set 320 including an instance without corrupted data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to continuously protect data, the apparatus comprising:
   a code storage device storing executable code;
   a processor executing the executable code, the executable code comprising
      a mirror module mirroring a primary record set to a base record set;
      a log module accumulating a log of record changes to the primary record set across a plurality of storage appliances controlling a plurality of controllers, wherein each record change comprises a consistency group with data time-stamped from a single common clock source recording a write to the primary record set, a write update to the log describing the write to the primary record set, and a write completion indicating completion of the write to the primary record set and a time server in communication with the plurality of controllers provides the single common clock source for each controller;
      a change selection module selecting a record change; and
      a change application module applying the selected record change to the base record set to form a recovered record set.

2. The apparatus of claim 1, wherein the primary record set is stored across a plurality of primary volumes and the log module is further configured to accumulate the log of record changes from the primary record set across the plurality of primary volumes.

3. The apparatus of claim 1, further comprising a control data set module tracking the write to the primary record set, the write update, and the write completion for each record change until the record change is complete.

4. The apparatus of claim 1, further comprising a state data set module mapping a volume comprising the primary record set to a volume comprising the base record set and the log.

5. The apparatus of claim 1, further comprising a flash copy module applying the record change to the base record set to form a flash record set.

6. A code storage device storing executable code executed by a processor to perform an operation to continuously protect data, the operation comprising:
   mirroring a primary record set to a base record set;
   accumulating a log of record changes to the primary record set across a plurality of storage appliances controlling a plurality of controllers, wherein the record changes each comprise a consistency group with data time-stamped from a single common clock source recording a write to the primary record set, a write update to the log describing the write to the primary record set, and a write completion indicating completion of the write to the primary record set, and wherein a time server in communication with the plurality of controllers provides the single common clock source for each controller and the log is accumulated in a backup volume;
   selecting a record change; and
   applying the selected record change to the base record set to form a recovered record set.

7. The code storage device of claim 6, wherein the record change is from at least one primary volume attached to at least one storage appliance.

8. The code storage device of claim 7, further comprising an operation to map the at least one primary volume to the backup volume.

9. The code storage device of claim 8, wherein the primary record set is stored in a plurality of primary volumes and the log of record changes is accumulated from across the plurality of primary volumes.

10. The code storage device of claim 6, further comprising an operation to tracking the write to the primary record set, the write update, and the write completion for each record change until the record change is complete.

11. The code storage device of claim 6, further comprising an operation to select the record change as occurring forward in time from a specified recovery instance.

12. The code storage device of claim 6, further comprising an operation to select the record change as occurring backward in time from a specified recovery instance.

13. The code storage device of claim 6, further comprising an operation for a user to select and deselect the record change.

14. The code storage device of claim 6, further comprising an operation to apply the record change to the base record set to form a flash record set.

15. The code storage device of claim 14, wherein the flash record set comprises one or more record changes applied to the base record set up to a specified terminator selected from a specific point in time and a specified event.

16. The code storage device of claim 15, wherein the flash record set is stored on a different storage subsystem.

17. The apparatus of claim 1, the change selection module selecting the record change as occurring forward in time from a specified recovery instance and as occurring backward in time from a specified recovery instance.

18. A system to continuously protect data, the system comprising:

a plurality of storage appliances controlling a plurality of controllers;

a time server in communication with the plurality of storage appliances and the plurality of controllers and providing a single common clock source for each controller;

a primary volume storing a primary record set;

a primary controller of the plurality of controllers in communication with at least one storage appliance and managing the primary volume;

a backup volume storing a base record set and a log;

a backup controller of the plurality of controllers in communication with at least one storage appliance, managing the backup volume, and comprising a code storage device storing executable code and a processor executing the executable code, the backup controller further comprising a mirror module mirroring the primary record set to the base record set;

a log module accumulating record changes to the primary record set in the log across the plurality of storage appliances, wherein each record change is configured as a consistency group comprising data time-stamped from the single common clock source recording a write to the primary record set, a write update to the log describing the write to the primary record set, and a write completion of the write to the primary record set;

a change selection module selecting a record change; and a change application module applying the selected record change to the base record set to form a recovered record set.

19. The system of claim 18, further comprising a plurality of primary volumes and wherein the primary record set is stored in the plurality of primary volumes and the log module further accumulates the log of record changes from the primary record set across the plurality of primary volumes and across the plurality of storage appliances.

20. The system of claim 18, further comprising a control data set module tracking the write to the primary record set, the write update, and the write completion for each record change until the record change is complete.

21. The system of claim 18, further comprising a state data set module mapping the primary volume to the backup volume.

22. The system of claim 18, further comprising a flash copy module applying the record change to the base record set to form a flash record set.

23. The system of claim 18, the change selection module selecting the record change as occurring forward in time from a specified recovery instance and as occurring backward in time from a specified recovery instance.

24. A method for deploying computer infrastructure, comprising integrating a code storage device storing computer-readable code into a computing system, wherein the code executed by the computing system performs the following:

mirroring a primary record set stored across a plurality of primary volumes to a base record set;

accumulating, by use of the computing system, a log of record changes to the primary record set across the plurality of primary volumes and across a plurality of storage appliances controlling a plurality of controllers, wherein each record change is configured as a consistency group comprising data time-stamped from a single common clock, source recording a write to the primary record set, a write update to the log describing the write to the primary record set, and a write completion for the write to the primary record set and a time server in communication with the plurality of controllers provides the single common clock source for each controller;

selecting a record change; and applying the selected record change to the base record set to form a recovered record set.

25. The method of claim 24, wherein a user to selects and deselects the record change.

26. The method of claim 24, further comprising selecting the record change backward in time from a specified recovery time and selecting the record change forward in time from the specified recovery time.

27. The method of claim 24, the method further comprising tracking the write to the primary record set, the write update, and the write completion for each record change until the record change is complete.

28. An apparatus to continuously protect data, the apparatus comprising:

a code storage device storing, executable code;

a processor executing the executable code, the executable code comprising means for mapping a primary volume to a backup volume;

means for mirroring a primary record set of the primary volume to a base record set of the backup volume;

means for accumulating a log of record changes to the primary record set across a plurality of storage appliances controlling a plurality of controllers wherein the log is stored in the backup volume and each record change is configured as a consistency group comprising data time-stamped from a single common clock source recording a write to the primary record set, a write update to the log describing the write to the primary record set, and a write completion for the write to the primary record set and a time server in communication with the plurality of controllers provides the single common clock source for each controller;

means for tracking the write to the primary record set, the write update, and the write completion for each record change until the record change is complete;

means for tracking the status of each record change;

means for selecting a record change; and means for applying the selected record change to the base record set to form a recovered record set.

29. The apparatus of claim 28, further comprising means for mapping a plurality of primary volumes to the backup volume wherein the primary record set is stored across the plurality of primary volumes and means for accumulating the log of record changes to the primary record set across the plurality of primary volumes.

30. The apparatus of claim 28, the means for applying further selecting the record change as occurring forward in time from a specified recovery instance and as occurring backward in time from a specified recovery instance.

* * * * *